United States Patent [19]

Jones

[11] 4,189,459
[45] Feb. 19, 1980

[54] METHOD OF MAKING A SHELF SUPPORT POST

[76] Inventor: Wilson M. Jones, 1703 N. Beckley, Dallas, Tex. 75203

[21] Appl. No.: 932,203

[22] Filed: Aug. 9, 1978

Related U.S. Application Data

[63] Continuation-in-part of Ser. No. 803,725, Jun. 6, 1977, abandoned.

[51] Int. Cl.² .................. B29D 3/00; B29C 27/30
[52] U.S. Cl. ................... 264/255; 108/108; 156/293; 248/243; 264/261; 264/263; 264/267; 264/269; 264/271; 264/299
[58] Field of Search .............. 264/250, 261, 263, 267, 264/271, 255, 299; 248/241, 243, 244, 224.4, 245; 108/108, 109

[56] References Cited

U.S. PATENT DOCUMENTS

| | | | |
|---|---|---|---|
| 2,678,793 | 5/1954 | Brochstein | 108/108 |
| 2,967,625 | 1/1961 | Hoogenstyn | 108/109 |
| 3,193,885 | 7/1965 | Gartner et al. | 248/243 |
| 3,265,344 | 8/1966 | Ornstein | 248/243 |
| 3,502,531 | 3/1970 | Shockey | 264/261 |

Primary Examiner—W. E. Hoag
Attorney, Agent, or Firm—H. Mathews Garland

[57] ABSTRACT

Method for making an acrylic support post for display fixtures such as shelf units and hang racks. The post comprises an elongated acrylic transparent or translucent member having a longitudinal channel formed along one or a plurality of the sides of the post, a longitudinal anchor plate disposed along the bottom portion of the channel, a longitudinal hollow standard having spaced locking slots along the front face thereof secured with the anchor plate, and a casting around the anchor plate and standard filling the channel to lock the anchor plate in the channel. The casting is formed of a material which blends with the acrylic of the post such as a methyl methacrylate resin and the like. The anchor plate is securely locked in place by the casting while the standard is secured with the anchor plate by means of screws. The channel is rectangular having radiused bottom corners. The casting is made in defined stages. The standard and anchor plate are secured together and positioned as a unit in the channel during the first pouring stage of forming the casting followed by the final stage of pouring the casting.

10 Claims, 11 Drawing Figures

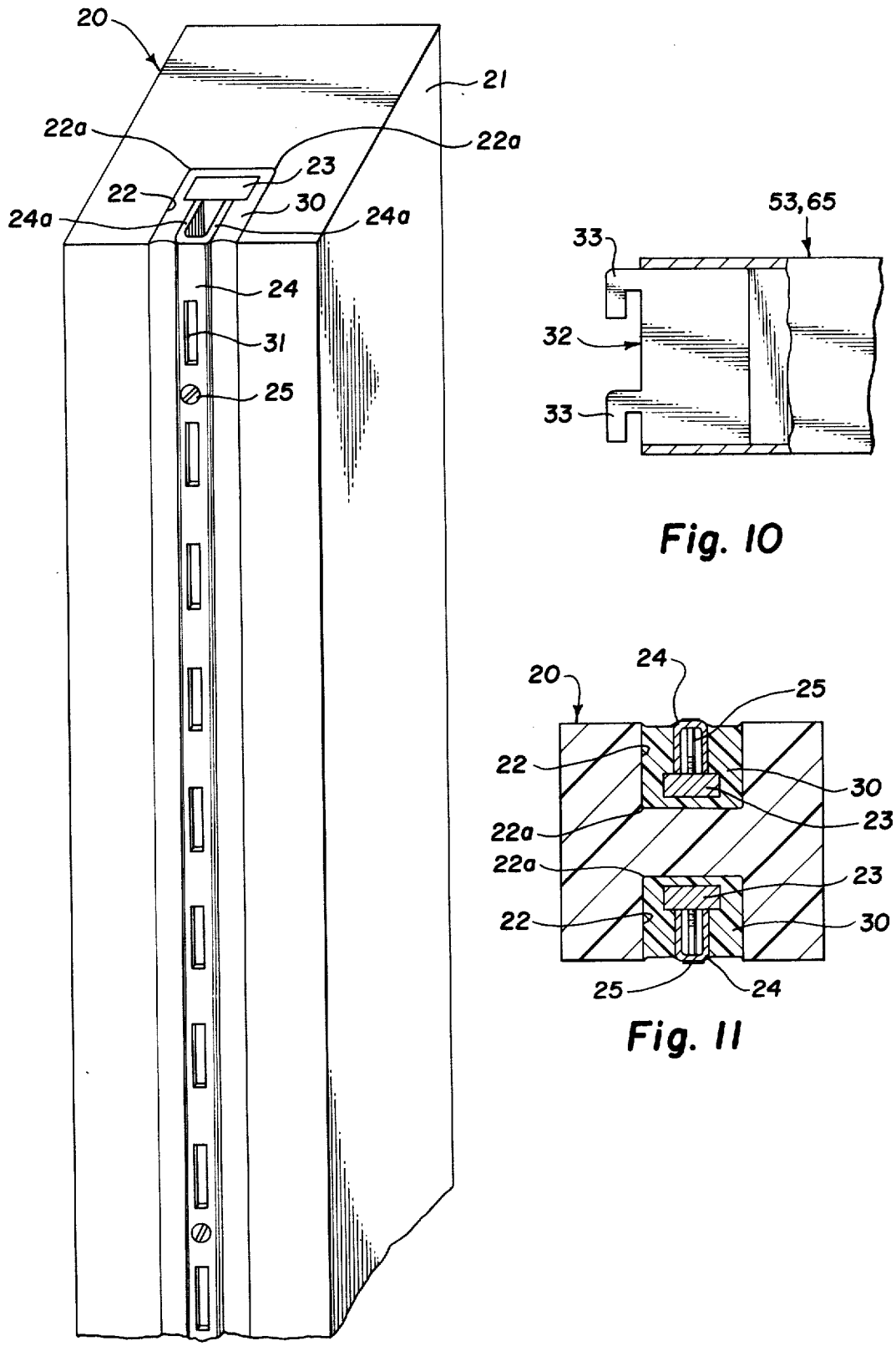

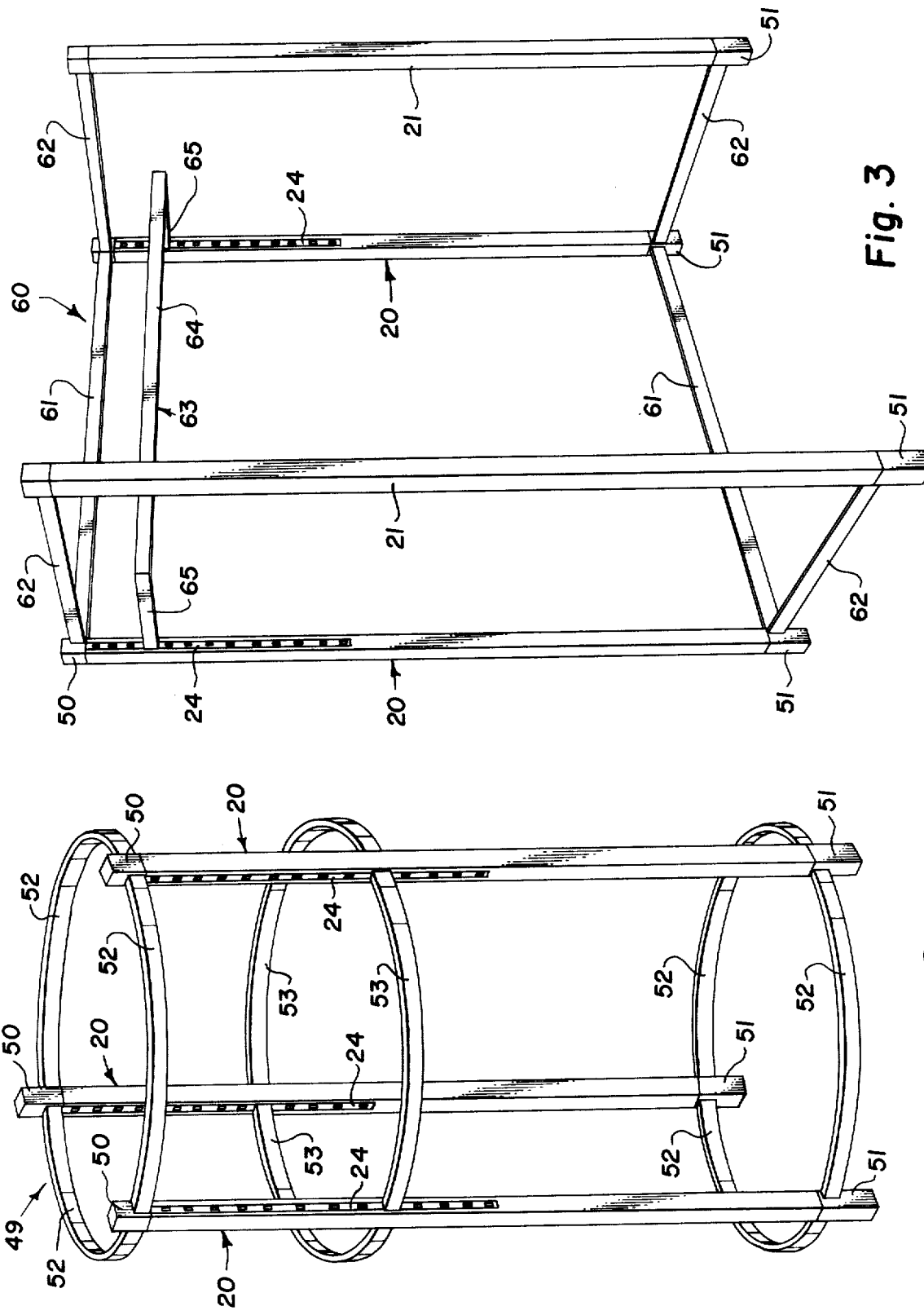

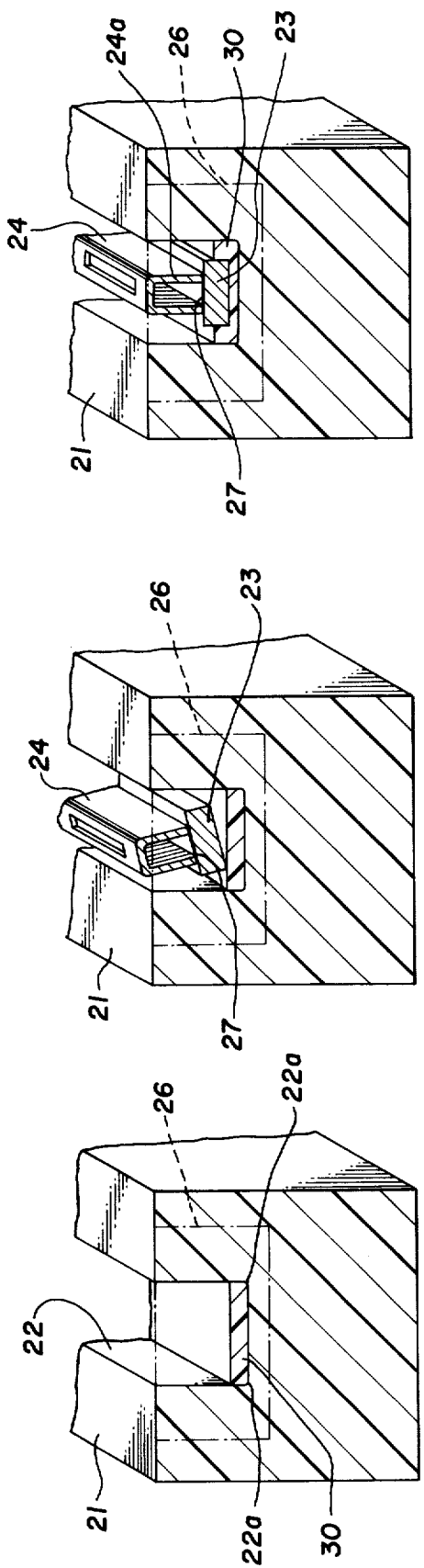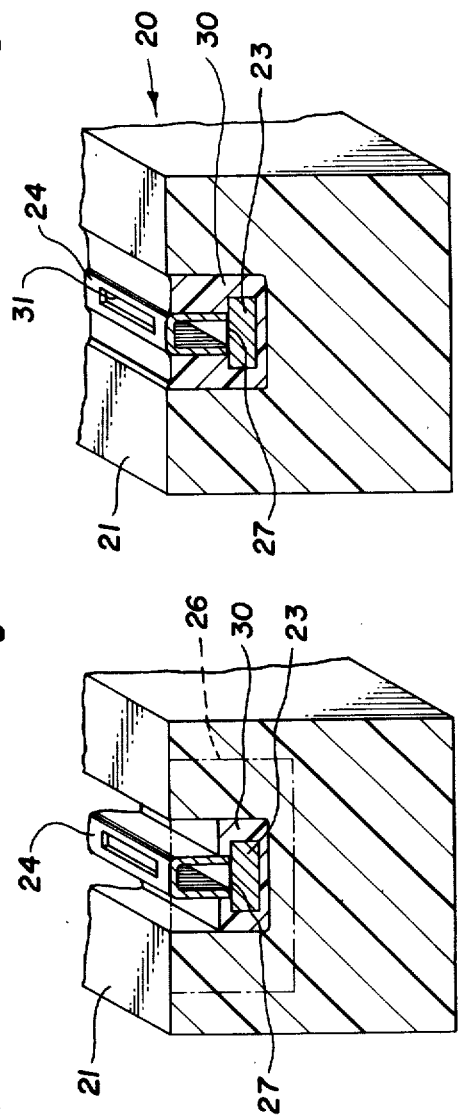
Fig. 5
Fig. 6
Fig. 7
Fig. 8
Fig. 9

METHOD OF MAKING A SHELF SUPPORT POST

This is a continuation-in-part of my patent application Ser. No. 803,725, filed June 6, 1977 entitled Display Fixture Support Post and Method and now abondoned.

This invention relates to posts for support of shelving and hanger bars in display fixtures and more specifically relates to clear and translucent acrylic plastic posts having standards provided with spaced locking slots for tongued fittings for supporting shelving and hang bars.

It has been common practice to construct display fixtures such as shelf units and hang bar assemblies using acrylic posts which may be transparent or translucent. Such posts have often included longitudinal standards having spaced locking slots for engagement by the necessary fittings for supporting shelves and hang bars. The standards have normally been secured in the posts either by means of screws or by embedding threaded bushings in the posts into which screws through standards are threaded. Both of these structures and techniques have two basic objections. In the clear acrylic posts everything which is embedded in the posts is fully visible from outside the posts and thus screws or threaded bushings severely detract from the appearance of the fixtures formed with the posts. Additionally, where the standards are secured by screws extending into the acrylic posts, the screws have a tendency to work loose easily, thereby impairing the structural rigidity and the useful life of the fixtures.

It is a particularly important object of the invention to provide a new and improved form of acrylic post for use in display fixtures such as shelf units and hang bar assemblies.

It is another object of the invention to provide an acrylic post which is aesthetically appealing.

It is another object of the invention to provide an acrylic post in which a standard is secured without the use of screws which are visible from outside of the post.

It is another object of the invention to provide an acrylic post having a standard secured with an anchor plate held in the post by a casting of a synthetic material which blends with the material forming the post.

It is another object of the invention to provide methods of locking a standard in a channel along an acrylic post including forming a casting of a synthetic material holding an anchor plate in the channel along the post.

In accordance with the invention there is provided apparatus and method forming a supporting post useful in a display fixture such as a shelf unit and a hang bar assembly. The post includes an elongated acrylic member having one or more longitudinal channels formed in the post, the channels being rectangular in cross section and having radiused bottom corners. A longitudinal anchor plate secured along the inside edges of a hollow standard is disposed along the bottom of the channel anchored in place by a casting formed of a material identical to the post. The casting is formed in two stages. During the first stage the standard and anchor plate are inserted in the channel between first and second step and pouring the first stage casting. The second stage is then poured along opposite sides of the standard on the first stage pour.

The foregoing objects and advantages of the invention together with specific details of preferred embodiments thereof will be better understood from the following detailed description taken in conjunction with the accompanying drawings wherein:

FIG. 1 is a longitudinal fragmentary view in perspective of one form of post constructed in accordance with the invention;

FIG. 2 is a view in perspective of a hang bar assembly utilizing posts formed in accordance with the invention;

FIG. 3 is a view in perspective of a hanger fixture using posts constructed in accordance with the invention;

FIG. 5 is a fragmentary perspective end view of one form of post used in the invention showing the completion of the first step in the first pour stage of forming the casting which locks the anchor plate and standard in the channel;

FIG. 6 is a fragmentary end view in perspective of the post of FIG. 5 showing the placing of the anchor plate and standard in the channel;

FIG. 7 is a fragmentary perspective end view of the port and anchor-plate-standard assembly in place at the completion of the first step of stage one of the method;

FIG. 8 is a fragmentary perspective end view of the post and anchor-plate-standard assembly at the completion of the stage one pour of the method;

FIG. 9 is a fragmentary perspective end view showing the post and anchor-plate-standard at the end of the second stage of the method;

FIG. 10 is a fragmentary side view in section of an end of one of the hang bars or shelf support structures showing the locking tongue arrangement used in association with the standard in the post for supporting hang bars and shelves in accordance with the invention; and FIG. 11 is an end view of a post formed in accordance with the invention showing the use of two standards in the post.

Figure 4:
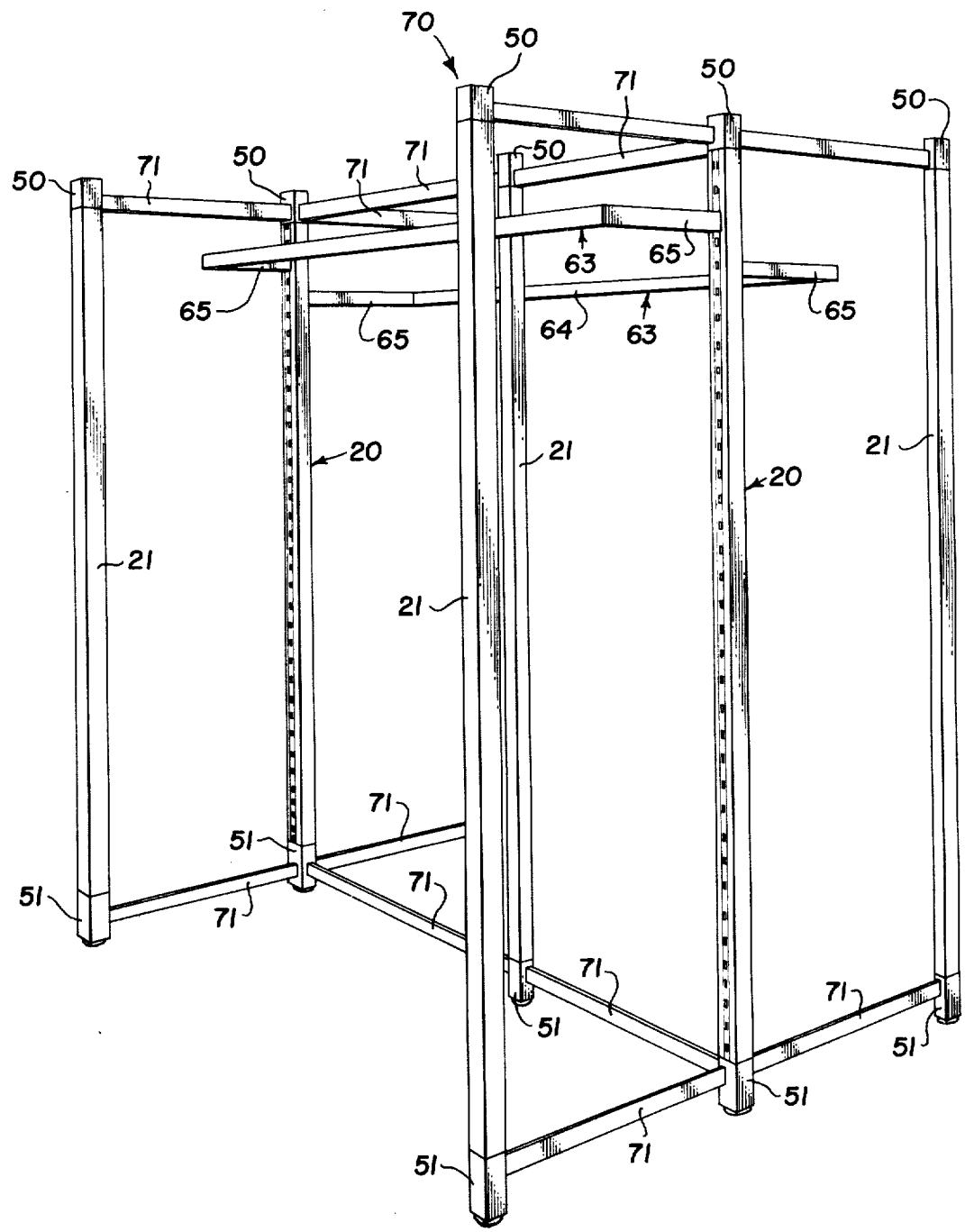
FIG. 4 is a view in perspective of another type of hang bar assembly utilizing posts formed in accordance with the invention.

Referring to FIG. 1, a post assembly 20 embodying the features of the invention includes a post 21 provided with a longitudinal rectangular longitudinal channel 22 having radiused bottom corners 22a, a longitudinal anchor plate 23 disposed in the channel near the bottom thereof, a longitudinal standard 24 secured to the anchor plate 23 by spaced screws 25, and a casting 30 around the anchor plate and standard locking the anchor plate in the post. The standard 24 is a hollow member, U-shaped in cross-section having parallel legs 24a, provided with longitudinally spaced slots 31 which are sized and spaced to receive an end bracket 32 as shown in FIG. 10 having a pair of hook-shaped tongues 33 which interlock with the standard for securing a shelf support or a hang bar as will be described in connection with the structures shown in FIGS. 2, 3 and 4. The casting 30 formed in the channel 22 around the anchor plate and standard 24 blends with the material forming the post so that it is not visible externally of the post along the length of the post. The casting permits the anchor plate to be securely held in the post without the necessity of screws extending through the plate into the post. The result is a very pleasing smooth appearance of the anchor plate along the back face and edges of the plate looking to the observer as though the plate were suspended in the plastic material of the post.

The post 20 is preferably an acrylic plastic material such as methyl methacrylate which forms an extremely clear hard structure and which, if desired, may be colored by mixture of a suitable dye with the plastic during molding of the plastic. The casting 30 is formed of methyl methacrylate. The methyl methacrylate casting bonds with the acrylic post and thus forms an integral structure with the post. Resins which are suitable for forming the methyl methacrylate casting and which have identical characteristics to the material forming the acrylic post are "PS-30 Component A" supplied by Cadillac Plastic and Chemical Company and Acrifix 90 made by Rohm GM BH Chemische Fabrik, West Germany. The resin is in a liquid form including an inhibitor which prevents the setting of the resin until it is mixed with a catalyst furnished by Cadillac Plastic and Chemical Company under the designation "PS-30 Component B" or Acrifix 20 supplied by Rohm GMBH. For forming the casting in the channel of the post the resin and catalyst are normally mixed in a ratio of 2.5 parts ±10% catalyst to 100 parts resin. The catalyst is first put in a mixing container followed by the monomer. The mixture is placed in a conventional blender under an infrared heat lamp which heats the mixture as it is blended to decrease the viscosity. The less viscous the mixture is the more readily air bubbles pass out of solution. After blending for approximately three minutes the container is placed in a vacuum chamber reduced to pressure level of about 22 to 23 inches of mercury to draw further gas and air in the mixture to the surface. The vacuum cycle requires about three minutes. The mixture is then removed from the vacuum chamber and allowed to sit for an additional three minutes for further air and gas bubbles to rise to the surface. The surface is then skimmed removing the surface film which may include air and gas bubbles from the mixture. The mixture is than placed in the hypodermic syringe for pouring. Other details of forming and using such a casting are described in my U.S. Pat. No. 3,893,779 entitled STRUCTURAL JOINT, issued July 5, 1977.

In constructing the post assembly 20, the channel 22 is machined along the length of the post 21 with a substantially rectangular cross-section having radiused bottom corners 22a. The channel 22 may be machined in the post 21 in either of two ways. It is particularly important to emphasize that the channel 22 must be provided with the radiused bottom corners 22a, rather than square corners, to minimize the formation of air bubbles as the casting is poured in the channel. Square corners tend to entrap air as the resin and catalyst mixture is poured whereas radiused corners do not entrap the air. The channel may extend only a portion of the full length of the post for the distance that the anchor plate-standard is desired in the post such that the opposite ends of the channel do not open through the ends of the post whereby post material at the opposite ends of the channel close or dam the channel. The channel also may be formed the full length of the post opening through the opposite ends of the post in which case the opposite ends of the channel are temporarily closed or dammed by a plastic tape strip 26 illustrated in broken lines in FIG. 5. The purpose of damming the ends of the channel is to hold the liquid mixture of resin and catalyst in the channel until it fully sets forming the casing locking the anchor plate and standard in the post. A suitable tape for temporarily damming the opposite ends of the channel is manufactured by the Minnesota Mining and Manufacturing Company, St. Paul, Minn. under product No. 356.

Prior to beginning the pouring of the casting 30, the standard 24 is secured to the anchor plate 23 by means of the screws 25. When securing the standard with the anchor plate, a strip of tape 27 is placed along the open edge of the standard over the bottom edges of the legs of the standard and over the opposite ends of the standard. The standard is then screwed to the anchor plate so that the tape 27 is clamped tightly between the bottom edges of the standard legs and the top face of the anchor plate forming a seal between the top face of the anchor plate and the standard legs so that the liquid resin and catalyst mixture when poured around the anchor plate and standard will not flow into the hollow standard.

After the standard 24 is secured with the anchor plate 23 as described and the channel 22 is properly prepared for pouring the casting, the first step in the first stage of pouring the casting may be carried out. The proper mixture of resin and catalyst is prepared in the manner previously described. As described in detail in my patent, the mixture of resin and catalyst is deposited in the channel with a hypodermic syringe.

The first step in the first stage of pouring the casting 30 is depositing a predetermined amount of the liquid resin and catalyst mixture with the hypodermic syrings over the bottom of the channel 22. The predetermined amount is determined by the quantity required to cover the bottom of the channel to a depth about half the thickness of the anchor plate 23 when the standard and anchor plate assembly are inserted in the channel. The liquid casting material is deposited with the needle of the syringe moving the needle longitudinally along the length of the channel injecting the material slowly and steadily to minimize the formation of air bubbles as the material flows to the bottom of the channel. At the completion of this first step of the first stage the post with the deposited casting material will appear substantially as shown in FIG. 5.

The second step in the procedure is the insertion of the standard and anchor plate assembly. The assembly is held above the open top of the channel 22 with the anchor plate 23 downward. The channel and anchor plate assembly are lowered at an angle with one bottom corner edge of the anchor plate being inserted into the liquid casting material as represented in FIG. 6. The channel and anchor plate are then slightly rotated clockwise from the position shown in FIG. 6 about the first inserted corner edge until the bottom of the anchor plate is fully immersed in the liquid casting material as represented in FIG. 7. The reason for the angular insertion of the anchor plate into the liquid casting material with the subsequent rotation of the assembly is to displace any air bubbles which might tend to be entrapped in the liquid casting material beneath the anchor plate. With the procedure used, any air that might be entrapped will be forced along the bottom of the anchor plate and outwardly from beneath the anchor plate as the anchor plate is pressed or squeezed downwardly into the liquid casting material. The standard and anchor plate are pressed downwardly into the liquid casting material until the liquid material is squeezed upwardly along the opposite side edges of the anchor plate to approximately one-half the thickness of the anchor plate as shown in FIG. 7 which completes the second step in the first stage of the process. The third step in the first stage of pouring the casting material around the standard and anchor plate is represented in FIG. 8. The third step begins upon completion of the second step while the first poured liquid material is still in liquid form so that the third step pour will blend with the first step pour without any apparent boundary between the two quantities of casting material in the channel. The third step pour is made in the same manner by moving the hypodermic needle longitudinally down the channel on opposite sides of the standard above the anchor plate raising the level of the casting material on each side of the standard to a depth above the line of engagement of the bottom edges of the standard legs 24a with the top surface of the anchor plate 23.

After the completion of the first stage of pouring the casting material involving the first and third steps of depositing the liquid resin and catalyst in the channel, the blended pours are allowed to cure until the top surface of the casting material along the opposite sides of the standard are "tacky". This condition, depending upon temperature and humidity, will develop within approximately one to one and one-half hours.

It is extremely important to the invention that the pouring of the casting material be accomplished in the two separate stages and that at the completion of the first stage the liquid material be only slightly above the junction between the standard legs and the top surface of the anchor plate. This is important due to the fact that when the resin and catalyst are mixed and during the curing process substantial heat is liberated. The liberated heat raises the temperature of the anchor plate and the standard. If a continuous pour of the resin and catalyst mixture were made to raise the level of the casting material to the top of the standard on each side of the standard in the channel, the heat generated by the mixture of the resin and catalyst is so great that the legs of the standard will expand and thereafter contract leaving voids in the casting material along each side of the standard giving the appearance of air bubbles which are not desired, either structurally and from an aesthetic standpoint. On the contrary, by pouring the casting material during the first stage to a level only above the junction of the legs of the standard with the anchor plate, the standard is not heated sufficiently to expand the legs and the legs are locked in place when the casting material has cured so that the heat generated during the second and final stage of the pouring of the casting material cannot cause the expansion and contraction of the legs. The casting material progressively cures from the bottom up so that the curing solidifies the first stage pour sufficiently to lock the standard legs in place while the top surface of the first pour is still sufficiently tacky for the second stage pour to be made without any evidence of a boundary between the first stage pour and the second stage pour.

After the curing of the first stage pour of the casting material is completed as above discussed to the "tacky" surface condition, the last step of the procedure comprising the second stage pour is made along the opposite sides of the standard. The "tacky" condition of the surface of the first pour is measured by pressing the tip of a needle or a wire against such surface. The point of the needle or wire should slightly penetrate the surface but not go all the way down in the first pour because of the prior solidification of the pour up to a depth just below the surface. If the second stage pour is made prematurely before the "tacky" condition has developed, a layer of uncured casting material is left between the first and second stage pours and such layer will remain in a semi-liquid condition and will not cure properly. On the other hand, if the first stage pour is allowed to cure beyond the "tacky" condition, the second pour will not blend properly with the first pour sufficiently to eliminate a visual boundary between the first and second pours.

The second stage pour is made to a depth at which the liquid resin and catalyst is substantially at the top surface of the standard taking care that the channel on opposite sides of the standard is not overfilled to a level at which the liquid casting material would flow over into the interior of the standard through the slots 31. After the second pour is made, the casting material will fully cure within approximately one hour depending upon the temperature and humidity conditions under which the invention is practiced. After curing the casting material shrinks slightly providing a moderate concave surface along each side of the standard within the channel as shown in FIG. 9. The resulting casting locks the anchor plate and standard assembly in the post and blends with the post so that the boundaries between the casting and post are not visible. The anchor plate and standard appear to have been cast in the post when the post was manufactured.

If, during the first and second stage pour operating conditions appear to cause excessive heating in the liquid monomer and catalyst mixture, cool air may be blown into the ends and slotted openings of the standard 24 to cool the structure.

FIG. 11 shows a form of the post assembly which utilizes two standards 24 secured with anchor plates 23 disposed along channels 22 extending along opposite faces of the post 21. The standards and anchor plates as shown in FIG. 11 are installed in exactly the same manner as described in connection with FIGS. 5-9.

The various forms of post assemblies which have been described and illustrated are useful to construct a number of different configurations of hang bar and shelf assemblies as illustrated in FIGS. 2, 3 and 4. Referring to FIG. 2, a generally circular hang bar assembly 49 is formed by using three post assemblies 20 having the double standard arrangement represented in FIG. 11. The posts are arranged at 120° degree spacing around a circle having the desired diameter of the hang bar fixture. The upper and lower ends of each of the posts are fitted with rectangular top and bottom caps 50 and 51 respectively which are suitably made of rectangular chrome steel tubing. Upper bars 52 formed of rectangular chrome steel tubing each of which encompasses approximately 120° of the circular shape of the fixture 49 are secured at opposite ends such as by welding with the caps 50 forming a rigid circular upper end of the fixture. Similarly, identical arcuate steel tubing segments 52 are welded with the lower cap 51 providing a rigid circular lower end for the fixture. Three arcuate chrome steel tube segments 53, each encompassing approximately 120° in length, are each provided with an end bracket 32 as shown in FIG. 10. The end brackets 32 are secured in any suitable manner in the opposite open ends of the segments of tubing 53. The hang bar segments 53 are then secured at a desired height to the post assembly 20 by insertion of the bracket hooks 33 in the slots 31 of the standard 24 in adjacent post assemblies. The three hang bar segments may all be secured at the same height as shown in FIG. 2 or if desired each of the hang bar segments may be secured at different heights along the lengths of the standards in the post assemblies. If short garments such as blouses or shirts are to be displayed on the hang bar assembly 50 two sets of the hang bar segments may be fitted between the posts and standards one above the other.

Another form of hang bar fixture 60 is illustrated in FIG. 3. The fixture 60 includes two of the single post assemblies 20 as illustrated in FIG. 1 and two plain posts 21 constructed without a standard 24. The post assemblies and the plain post 21 are connected together at the top in a rectangular configuration by a longitudinal horizontal bar 61 and horizontal end bars 62. The bars 61 and 62 are connected into the top or upper caps 50 which are secured on the upper ends of the posts. Similarly, lower bars 61 and 62 are connected with lower end caps 51 on the lower ends of the post assemblies 20 and the plain posts 21. A removable rectangular hang bar assembly 63 is supported from the standard 24 running along the two post assemblies 20. The hang bar assembly 63 is formed by longitudinal bar 64 connected at opposite ends with end bars 65. Each of the free ends of the end bars 65 is provided with an end bracket 32 for releasibly hooking the hang bar assembly with the standards of the post 20 at the desired height along the lengths of the posts. It will be evident that the hang bar assembly 63 may be placed at any desired height along the full lengths of the standards 24 and for short garments at least two of the hang bar assemblies may be used along the post assemblies at different heights.

A still further form of hang bar fixture 70 is shown in FIG. 4 utilizing two of the double post assemblies 20 as illustrated in FIG. 11. The fixture 70 also includes plain end posts 21 and a plain central post 21 situated parallel with and midway between the post assemblies 20. All of the posts are provided with the upper and lower caps 50 and 51 as previously discussed. The end posts are connected together by upper and lower end bars 71 which are connected at opposite ends with the upper and lower caps 50 and 51 respectively. The post assemblies 20 are secured with the central plain post 21 by horizontal bars 71 which also are connected with the upper and lower caps on the respective post assemblies 20 and the central plain post 21. Two of the hang bar assemblies 63 are releasibly secured along opposite sides of the post assemblies 20. Each of the hang bar assemblies 63 may be releasibly locked at any desired height along the length of the post assemblies.

It will be apparent that while the fixtures shown in FIGS. 2, 3 and 4 are each described and illustrated as hang bar type fixtures, shelf fixtures may be readily provided by suitably securing shelves, not shown, on the top surfaces of the hang bars or by utilizing readily available standard shelf supports equipped with the end brackets 32.

Innumerable other configurations of display fixtures may be constructed using the post assemblies formed in accordance with the invention. The fixtures so constructed are very rigid and extremely attractive artistically.

What is claimed is:

1. A method of fabricating a post assembly for display fixtures comprising:
   Securing an anchor plate across an open side of a channel member, in contact with said member and extending laterally beyond said member on two sides thereof, disposing said channel member and said anchor plate in a recess in an elongated member and spaced from surfaces defining said recess, casting hardenable resin in said recess and about said anchor plate and hardening said resin to secure said channel member in said recess.

2. A method in accordance with claim 1 wherein said post is formed of methyl methacrylate and said casting is formed of a methyl methacrylate resin mixed with an inhibitor for initially retaining said resin in liquid form and said resin is introduced into said recess in the presence of a catalyst causing said resin to cure into a solid body within said recess.

3. A method in accorance with claim 1 wherein said standard and said anchor plate are positioned in said recess in spaced relation from the bottom of said recess and said casting is a continuous phase along the sides and the bottom of said standard and anchor plate in said recess.

4. A method in accordance with claim 1 wherein said casting comprises a first stage pour having a depth above the junction between the end edges of the legs of said standard and the top face of said anchor plate and a second stage pour on said first stage pour extending to substantially the top of said standard.

5. The method of claim 1 including securing said anchor plate to said channel member with screws.

6. The method of claim 1 wherein said channel member has spaced slots along the length thereof.

7. The method of claim 1, including a step of excluding resin from interior portions of said channel.

8. The method of claim 1, wherein said elongated member is made of a plastics material.

9. A method of fabricating a plastic post assembly for display fixtures comprising: forming a longitudinal rectangular recess having radiused bottom corners along the length of a plastic post; closing the opposite ends of said recess; depositing a first stage pour of a liquid casting material of the same composition as said post over the bottom of said recess to a predetermined depth; while said first pour of casting material is liquid positioning an anchor plate-standard assembly in said recess by first lowering said assembly at an angle whereby one longitudinal lower corner edge of said anchor plate first enters the top surface of said liquid casting material and thereafter said assembly is rotated about said first corner edge of said anchor plate until the bottom of said anchor plate is fully immersed in said liquid casting material and said casting material is at a depth around said anchor plate at substantially the midpoint of the side edges of said anchor plate; continuing said first stage pour of said casting material until said casting material covers the edges and top of said anchor plate and the sides of said standard to a depth above the junction of the legs of said standard with said anchor plate; curing said first stage pour of said casting material until the top surface of said first stage pour is tacky; making a second stage pour of said casting material in said recess along opposite sides of said standard above said first stage pour until said second stage pour is at a depth substantially at the top of said standard; and curing said second stage pour of said casting material until said second stage pour is fully solidified thereby locking said assembly in place in said recess by means of a homogenous continuous casting.

10. A method of fabricating a plastic post assembly in accordance with claim 9 wherein said casting material comprises a methyl methacrylate resin mixed with an inhibitor and said resin is poured in said recess in the presence of a catalyst causing said resin to cure into a solid body within said recess.

* * * * *